April 21, 1964 R. A. MacMILLAN 3,130,362

AUTOMATIC PHASE STABILIZER SYSTEM

Filed May 5, 1959 2 Sheets-Sheet 1

INVENTOR.
RAYMOND A. MACMILLAN
BY Wade Koontz
George Fine
ATTORNEYS

INVENTOR.
RAYMOND A. MACMILLAN
BY Wade Koontz
George Fine
ATTORNEYS 3,130,362

AUTOMATIC PHASE STABILIZER SYSTEM

Raymond A. MacMillan, Greenwood, Mass., assignor to the United States of America as represented by the Secretary of the Air Force Filed May 5, 1959, Ser. No. 811,238
1 Claim. (Cl. 323—101)
(Granted under Title 35, U.S. Code (1952), sec. 266)

The invention described herein may be manufactured and used by or for the United States Government for governmental purposes without payment to me of any royalty thereon.

This invention relates to electrical apparatus, and more particularly to apparatus shifting the phase of an electrical signal 90° while automatically and precisely maintaining the 90° phase shift as the frequency of the electrical signal is being varied over a wide range.

In many electrical circuits and apparatus, it is highly desirable to shift the phase of an electrical signal 90°. An R–C network has been for the most part utilized in the past to provide the aforesaid phase shift. However, there are limitations inherent in an R–C network as the phase shift will vary from the desired 90° as the frequency of the electrical signal applied thereto varies.

The present invention provides a novel system wherein an R-C network in combination with an amplifier is utilized to produce a 90° phase shift of an electrical signal. The resistor of the R-C network is in series with the input terminal of the amplifier and a feedback capacitor connects the output and the input terminals of the amplifier. This is an integrating type of circuit and well known in the art.

In this circuit, an applied electrical signal will have its phase shifted 90°, however the phase shift of 90° will be precise for only one specific frequency, and only when the value of the input resistance is equal to the capacitive reactance of the feedback capacitor. If the frequency of the applied electrical signal is altered, the value of the capacitive reactance changes and the input resistance is no longer equal to the capacitive reactance and the phase angle of the output signal is other than the desired 90°.

In order to maintain a 90° phase shift of an electrical signal, over a wide frequency range, a novel circuit is provided to control the input resistance to the amplifier so that it automatically is adjusted to equal the capacitive reactance of the feedback capacitor for any specific frequency within a wide frequency bandwidth range. In order to ensure a more precise control of the aforesaid R-C network, one of two values of the feedback capacitor is automatically selected by an additional circuit.

It is to be noted that in the aforegoing described amplifier having a series input resistor and a feedback capacitor that when the capacitive reactance of the feedback capacitor is made equal to the input resistor the over-all gain is unity and the phase angle is 90° with an error of $1/A$ radians where A is the open loop gain. When the input resistor is no longer equal to the capacitive reactance, resulting from a frequency shift, then the gain of the amplifier is no longer unity.

Conversely, when the voltage of the applied signal is made equal to the output voltage from the amplifier for any applied frequency, by adjusting the value of the input resistance then the gain of the amplifier is unity and the input resistance is equal to the capacitive reactance and the resulting phase angle of the output signal as compared to the applied signal is 90° with negligible error. For example, with an amplifier voltage gain of 4,000, the output voltage will have a 90° phase angle within an error of 0.01432°, 1 radian=57.3° or $\frac{1}{4000}$ radian=0.01432°.

An object of the present invention is to provide a novel apparatus providing a precise 90° phase shift for an applied electrical signal and automatically maintaining aforesaid 90° phase shift as the frequency of the applied electrical signal varies.

Another object of the present invention is to provide a novel electrical apparatus including an R-C network in combination with an amplifier to shift the phase of an applied signal 90° and automatically maintain aforesaid 90° phase shift as the frequency of the applied electrical signal varies.

Still another object of the present invention is to provide an electrical apparatus including an R-C network in combination with an amplifier to precisely shift the phase of an applied signal 90° and automatically maintain the phase shift as the frequency of the applied signal varies, the magnitude of the shifted signal always remaining equal to that of the applied signal.

Yet another object of the present invention is to provide a phase shifting electrical apparatus including an R-C network in combination with an amplifier to automatically maintain the gain of the amplifier at unity as the frequency of the applied signal varies.

Further objects, features and advantages of this invention will suggest themselves to those skilled in the art and will become apparent from the following description of the invention taken in connection with the accompanying drawings in which.

Figures 1, 2:
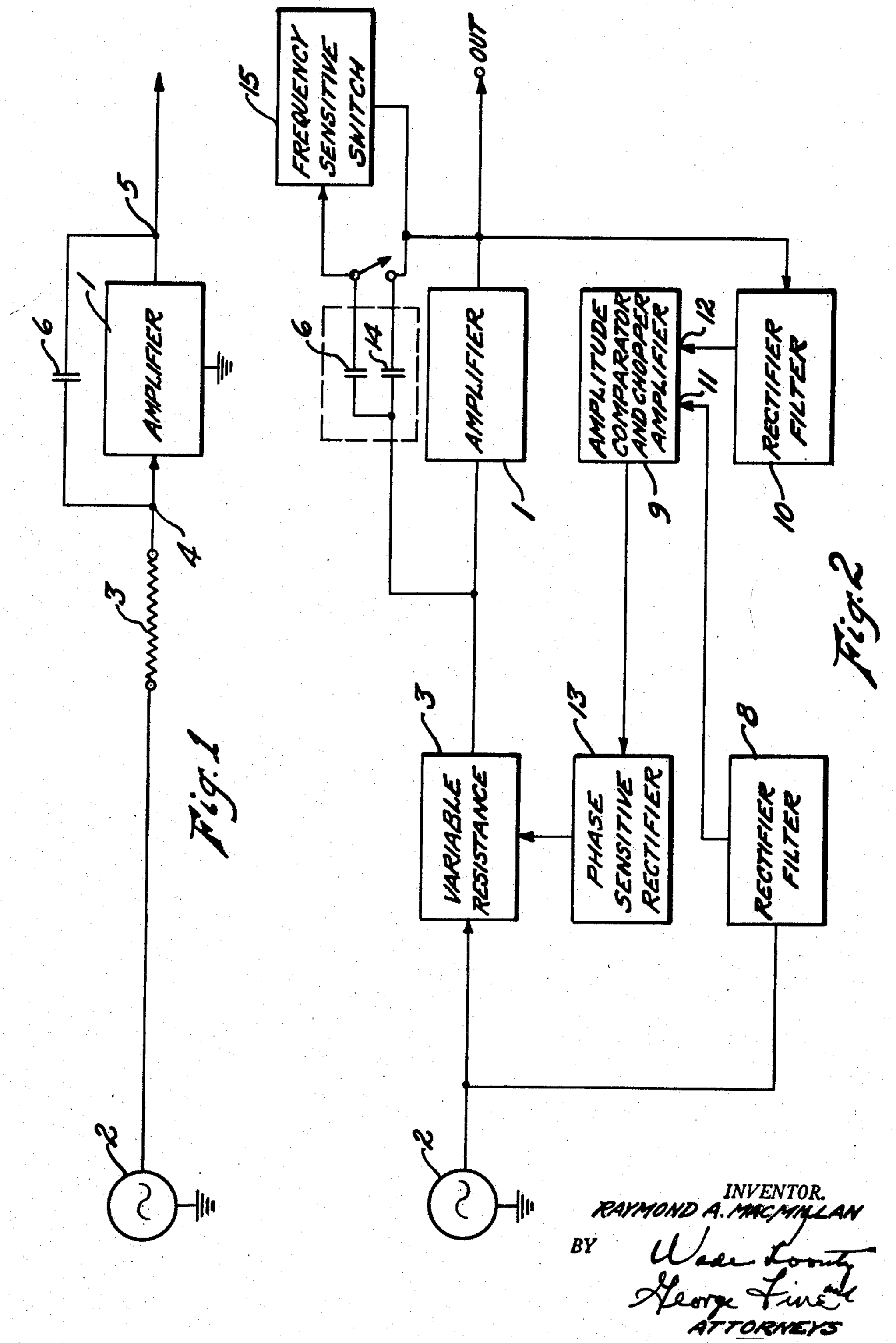
FIGURE 1 is a block diagram of a conventional R-C feedback amplifier.
FIGURE 2 is a block diagram illustrating one embodiment of the present invention.

Reference is made now more particularly to FIGURE 1 in which high gain amplifier 1 receives a signal from source 2 by way of input resistor 3. Signal source 2 has a varying frequency. Output terminal 5 is connected to input terminal 4 by way of capacitor 6. When the value of resistance 3 is made equal to the value of the capacitive reactance $X_c$ of capacitor 6 for any specific input frequency, the over-all gain G is unity and the phase angle of the output signal at terminal 5 is 90° with respect to the input signal from source 2. The error with aforegoing conditions would be $1/A$ radians where A is the open loop gain. When resistance 3 is not equally adjusted to the capacitive reactance, $X_c$, then the output signal from terminal 5 differs from the input signal. The gain, G, is also other than unity so that $G=X_c$/resistance 3.

Conversely, when the input voltage is made equal to the output voltage for any input frequency, by adjusting resistance 3, $G=1$, resistance $3=X_c$, and the resulting phase angle of the output signal is 90° with negligible error. For example, with an amplifier voltage gain of 4000, the output voltage will have a 90° phase angle within an error of 0.01432°, 1 radian=57.3° or $\frac{1}{4000}$= 0.01432°.

Now referring to FIGURE 2, a novel system is provided thereby so that for any specific frequency of input signal, E in, the value of a series input resistor to an amplifier is automatically made equal to the capacitive reactance of the feedback capacitor connected between the output terminal and input terminal of aforesaid amplifier. Furthermore, when the value of the input resistance is made equal to the capacitive reactance of the feedback capacitor, the amplitude of the output signal, E out, is equal to the amplitude of the input signal, E in, and the phase of the output signal is precisely 90° different than the input signal.

In the operation of the block diagram of FIGURE 2, source 2 provides an A.C. signal of varying frequency which is fed to a varying resistance 3. Varying resistance 3 is described hereinafter in greater detail and it is a component whose resistance varies in accordance with a D.C. control voltage related to the input signal. Variable resistance 3 performs the same function as input resistor 3 of FIGURE 1. Variable resistance 3 provides a variable resistor for an A.C. signal which can be varied with a D.C. control voltage from a few hundred ohms to megohms. The A.C. signal from source 2 is also applied to rectifier filter 8 which produces a direct potential voltage to amplitude comparator 9 at point 11. Meanwhile an A.C. signal from variable resistor 3 is fed through amplifier 1 to rectifier filter 10 which then produces a D.C. voltage at point 12 of comparator 9. Comparator 9 has two D.C. signal inputs which it compares in amplitude. The output signal from comparator 9 is an A.C. signal. When the D.C. potentials are equal at points 11 and 12 then the output A.C. signal appears for comparator 9. However, if the potential at point 11 is more or less than the potential at point 12, the difference produces an A.C. output voltage from comparator 9. The amplitude of this voltage is proportional to the difference of the D.C. potentials at points 11 and 12. The A.C. signal from comparator 9 is fed to phase sensitive rectifier 13 which produces a D.C. control voltage fed to variable resistor 3. The aforesaid D.C. control voltage then changes variable resistance 3 in the right direction so that the D.C. potentials at points 11 and 12 are maintained equal, thus automatically maintaining the input signal, E in, and the output signal, E out, of amplifier 1 equal for any frequency.

In effect the values of capacitive reactance, $X_c$, of capacitor 6 and resistance 3 form a voltage divider at the input amplifier 1. If the frequency of the input signal is lowered, $X_c$, increases in value and the amplifier receives less voltage consequently giving less output. The reverse is true if the frequency is raised. If now the value of resistor 3 is adjusted so that the output voltage equals the input voltage then $X_c$=resistor 3 and a 90° phase angle is assured, amplifier 1 having been previously adjusted for unity gain under this condition.

To cover a wide range feedback capacitor 6 can have its value increased by automatically adding the parallel capacity 14 as the frequency of the input signal, E in, is lowered. This is accomplished by feeding the output signal, E out, from amplifier 1 to frequency sensitive switch 15 which will insert capacitor 14 in parallel with capacitor 6 in accordance with a frequency change. The frequency sensitive switch is explained in greater detail hereafter.

Figure 3:
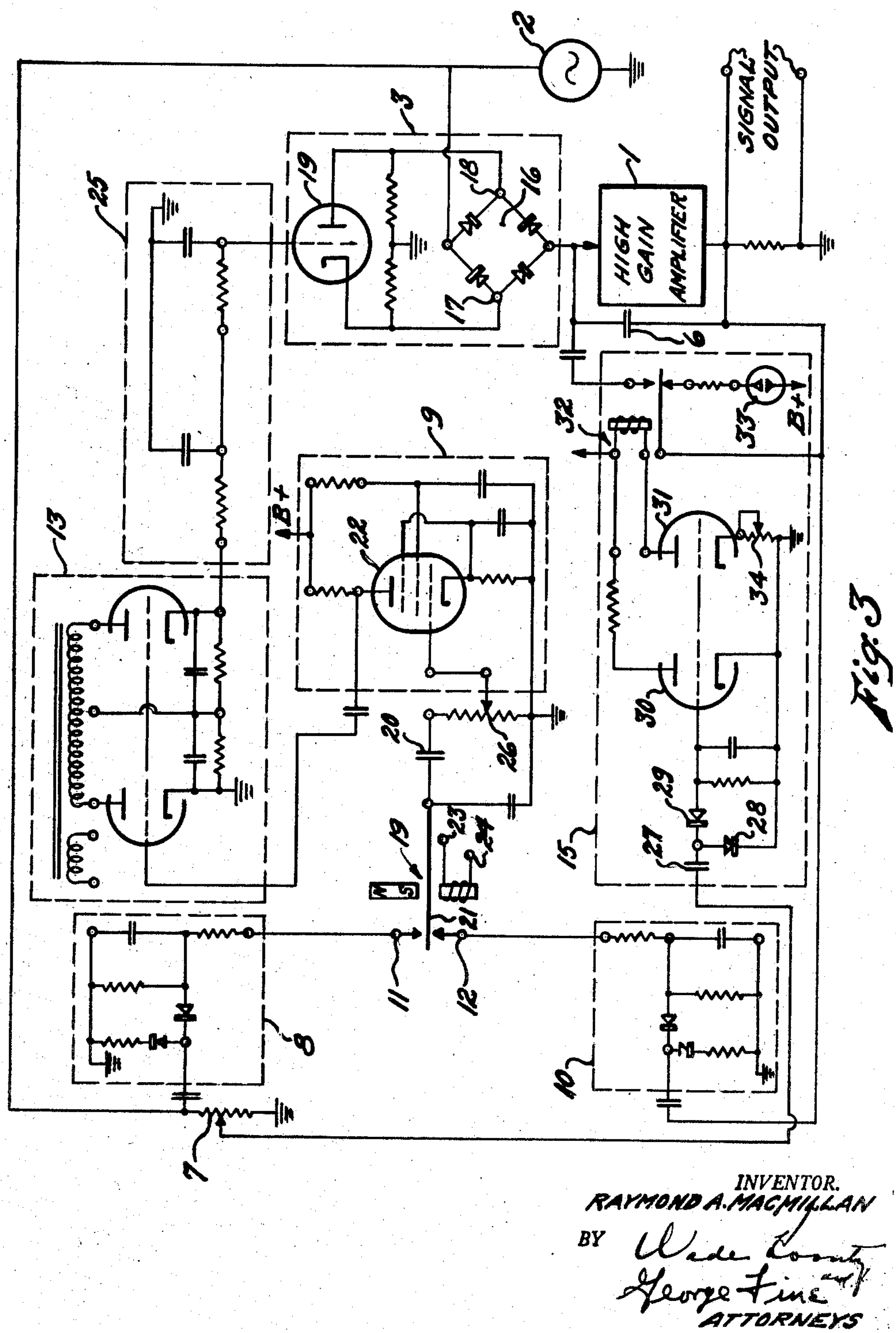
FIGURE 3 is the schematic diagram of the block diagram of FIGURE 2.

Now referring in detail to FIGURE 3, there is shown the schematic diagram of an embodiment of the present invention. Source 2 provides a signal whose frequency varies. The signal is fed to amplifier 1 by way of variable resistance 3. The apparent resistance of the full-wave bridge 16 to the impressed A.C. signal is a function of the resistance inserted in D.C. branch 17—18. The D.C. resistance is in turn determined by the resistance of electron discharge device 19. The resistance of electron discharge device 19 is determined by the potential applied to its control grid, the anode of the device is of course connected to the positive terminal of bridge 16 and its cathode is connected to the negative terminal of bridge 16 which controls the flow of D.C. The combination of electron discharge device 19 and full-wave rectifier 16 provides a variable resistor for A.C. signals which can be varied with a D.C. voltage from a few hundred ohms when the tube is conducting, to megohms when the tube is cutoff. This aforesaid combination replaces input resistance 3 of FIGURE 1. A more detailed explanation of variable resistance 3 is supplied in my copending patent application Serial No. 811,237, entitled Variable A.C. Transducer, filed at even date herewith.

The A.C. signal which is applied to variable resistor 7 is also simultaneously applied to rectifier filter circuit 8 which provides a D.C. voltage to point 11 of amplitude comparator 9. The A.C. output signal from amplifier 1 is fed to rectifier filter 10 which supplies a D.C. voltage to point 12 of amplitude comparator 9. Points 11 and 12 are contacts for vibrator 19. If the D.C. voltages are equal at points 11 and 12, no change in the charge of coupling capacitor 20 occurs as vibrator arm 21 contacts each point. As a result, no alternating voltage appears at the output of comparator 9. However, if the potential at 11 is more or less than that at 12, the difference becomes chopped and the alternating voltage is amplified by the amplifier which incorporates tube 22. The phase angle of this voltage relative to the phase angle of the energizing voltage applied to terminals 23—24 of vibrator 19 had one of two possible values 0° or 180°. The phase of the vibrator drive voltage applied to terminals 23—24 is so chosen that the direct potential produced by phase sensitive rectifier 13 drives or changes variable resistor 3 in the right direction so that the D.C. voltages at points 11 and 12 are maintained at an equal value, thus automatically maintaining the input and output voltages of amplifier 1 equal for any frequency. Filter 25 controls the speed of response and damping of the servo loop and prevents spurious voltages appearing in the output of amplifier 1. Potentiometer 26 controls the gain, hunting or oscillation of the servo loop.

In order to cover a wide range, the value of capacitor 6 is automatically changed by adding or subtracting parallel capacity 14. This automatic increase or decrease of capacity is in response to a change of frequency of the input signal from source 2. The input signal from source 2 is applied to automatic switch 15 by way of capacitor 27 which is in series with rectifiers 28 and 29 and associated load resistors. These are provided for positive and negative halves of the cycle thus maintaining equal current flow for each half of the cycle. Alternating current flow in this circuit is mainly determined by the total circuit impedance of the resistance and capacitance. Due to the effect of capacitive reactance, the D.C. voltage appearing at the grid tube 30 will be a function of frequency and will increase as frequency increases. Relay 32 connected between the plates of twin triode tubes 30 and 31 in a bridge circuit and serves as a switch, adding capacitor 14 in parallel to capacitor 6 upon a change of frequency. Tubes 30 and 31 are self biased and the position of potentiometer 34 determines the relative quiescent current in the relay coil. The circuit is so adjusted that relay 32 remains energized by quiescent current in tube 31 for all frequencies below a preselected frequency. Above the preselected frequency, the increasing positive voltage on the grid of tube 30 causes this tube to draw more current, reversing the current in the relay coil and allowing the armature to switch and change to total value of capacity. Due to the nature of the polarized relay, further increase in the positive voltage on the grid of tube 30 has no further effect. Neon indicator lamp 33 operated from one of the relay contacts 34 shows the operator which relay position is being used for any frequency.

While a particular embodiment of the invention has been shown and described, modifications may be made and it is intended in the appended claims to cover all such modifications as may fall within the true spirit and scope of the invention.

What is claimed is:

In an automatic phase stabilizer system, a source of A.C. signal having a wide variation of frequency, an amplifier having input and output terminals, a variable resistance connected between said signal source and said amplifier, capacitive means having capacitive reactance interconnecting said output and input terminals, means to preset the value of said variable resistance to equal the value of said capacitive reactance in the presence of specific frequency signal from said source, means to alter the value of said capacitive means in accordance with the frequency of said A.C. signal from said source, and means to automatically and continuously maintain the value of said variable resistance equal to the value of said capacitive reactance in accordance with the variation of the frequency of said A.C. signal from said source, said automatic means receiving an output signal from said amplifier for conversion to a direct current signal for application to said variable resistor.

References Cited in the file of this patent

UNITED STATES PATENTS 2,749,502 Ragazzini et al. ---------- June 5, 1956
2,946,004 Frank ------------------ July 19, 1960